United States Patent

Shimizu

[11] Patent Number: 5,257,328
[45] Date of Patent: Oct. 26, 1993

[54] DOCUMENT RECOGNITION DEVICE

[75] Inventor: Noboru Shimizu, Kanagawa, Japan

[73] Assignee: Fuji Xerox Co., Ltd., Tokyo, Japan

[21] Appl. No.: 861,600

[22] Filed: Apr. 1, 1992

[30] Foreign Application Priority Data

Apr. 4, 1991 [JP] Japan .................................. 3-098014

[51] Int. Cl.⁵ .............................................. G06K 9/20
[52] U.S. Cl. .......................................... 382/61; 382/14; 382/39; 382/57
[58] Field of Search .......................... 382/61, 39, 59, 37, 382/57, 14; 395/21, 151

[56] References Cited

U.S. PATENT DOCUMENTS

| | | | |
|---|---|---|---|
| 4,860,376 | 8/1989 | Tanaka et al. | 382/57 |
| 4,907,283 | 3/1990 | Tanaka et al. | 382/57 |
| 5,025,484 | 6/1991 | Yamanari et al. | 382/61 |
| 5,040,227 | 8/1991 | Lyke et al. | 382/57 |
| 5,052,043 | 9/1991 | Gaborski | 382/14 |

FOREIGN PATENT DOCUMENTS 2-159690 6/1990 Japan.

OTHER PUBLICATIONS

Image Processing Handbook, published by Skokodo, 20.3 Character Recognition Device (OCR) pp. 482–490.

*Primary Examiner*—Joseph Mancuso
*Attorney, Agent, or Firm*—Finnegan, Henderson, Farabow, Garrett & Dunner

[57] ABSTRACT

A document recognition device capable of correcting results obtained by recognizing a character image. The document recognition device includes a character recognizing unit for recognizing a character image, a correction data base in which correction information on mis-recognized characters which were targets to be corrected by an operator has been registered, an automatic correction unit for correcting results recognized by the character recognizing unit by use of the correction data base, an operator's correction unit by which the operator corrects results corrected by the automatic correction unit, and a correction data base updating unit for registering, in the correction data base, correction information obtained from the results recognized by the character recognizing unit and the results corrected by the operator's correction unit.

8 Claims, 7 Drawing Sheets

| 51 | 511 RECOGNIZED CHARACTER | 512 AUTOMATIC CORRECTION CHARACTER | 513 OPERATOR'S CORRECTION CHARACTER |
|---|---|---|---|
| 1 | 1 | [ | [ |
| 2 | 1 | [ | 1 |
| 3 | } | 1 | ] |
| 4 | | | |
| 5 | b | p | p. |
| 6 | r | r | r |
| 7 | o | o | o |
| 8 | p | b | b |
| 9 | L | 1 | 1 |
| 10 | e | e | e |
| 11 | m | m | m |
| ⋮ | | | |

FIG. 5

[1] problms

------94

FIG. 8 (C) PROCESSING IN CORRECTION DATA BASE UPDATING UNIT 63

FIG. 9(a)

| | 641 | 642 | 643 | 644 | 6450 | 6451 | 6460 | 6461 | 6470 | 6471 |
|---|---|---|---|---|---|---|---|---|---|---|
| | RECOGNIZED RESULT | AUTOMATIC CORRECTION FLAG | NUMBER OF TIMES OF OCCURRENCE | NUMBER OF TIMES OF CORRECTION | CORRECTION CHARACTER | NUMBER OF TIMES | CORRECTION CHARACTER | NUMBER OF TIMES | CORRECTION CHARACTER | NUMBER OF TIMES |
| 1 | 1 | 1 | 100 | 90 | [ | 60 | ] | 10 | ) | 15 |
| 2 | ) | 1 | 234 | 150 | 1 | 80 | ] | 40 | 1 | 10 |
| 3 | m | 0 | 5 | 0 | | | | | | |
| 4 | b | 1 | 20 | 15 | p | 10 | h | 3 | q | 2 |
| 5 | p | 1 | 30 | 20 | b | 20 | | | | |
| 6 | L | 1 | 15 | 11 | 1 | 10 | 1 | 1 | | |
| 7 | o | 0 | 8 | 2 | 0 | 1 | e | 1 | | |
| ... | | | | | | | | | | |

FIG. 9(b)

| | 641 | 642 | 643 | 644 | 6450 | 6451 | 6460 | 6461 | 6470 | 6471 |
|---|---|---|---|---|---|---|---|---|---|---|
| | RECOGNIZED RESULT | AUTOMATIC CORRECTION FLAG | NUMBER OF TIMES OF OCCURRENCE | NUMBER OF TIMES OF CORRECTION | CORRECTION CHARACTER | NUMBER OF TIMES | CORRECTION CHARACTER | NUMBER OF TIMES | CORRECTION CHARACTER | NUMBER OF TIMES |
| 1 | 1 | 1 | 102 | 91 | [ | 61 | ] | 10 | ) | 15 |
| 2 | ) | 1 | 235 | 151 | 1 | 80 | ] | 41 | 1 | 10 |
| 3 | m | 0 | 6 | 0 | | | | | | |
| 4 | b | 1 | 21 | 16 | p | 11 | h | 3 | q | 2 |
| 5 | p | 1 | 31 | 21 | b | 21 | | | | |
| 6 | L | 1 | 16 | 12 | 1 | 11 | 1 | 1 | | |
| 7 | o | 0 | 9 | 2 | 0 | 1 | e | 1 | | |
| ... | | | | | | | | | | |

DOCUMENT RECOGNITION DEVICE

BACKGROUND OF THE INVENTION

1. Field of the Invention

The present invention relates to a document recognition device which is capable of correcting results obtained by recognizing character images.

2. Description of the Related Art

In recent years, researches have been carried out which relate to a document recognition device used to recognize characters and graphics printed in a paper document and input the recognized characters and graphics to a document editing device such as a word processor or the like. However, in fact, it is very difficult to obtain a rate of recognition of 100% in the conventional document recognition device, and at present an operator must confirm the recognized results and must correct mis-recognized characters, if any (see Image Processing Handbook published by Shokodo, 20.3 Character Recognition Device (OCR) p. 482–490). This operation must be performed with respect to all of the results recognized and, for this reason, this operation provides a very heavy burden to the operator. Also, since in the character recognition the document images to be recognized are often input from the same image input device and under the same condition, the same mis-recognition is easy to occur for the same character. By utilizing this fact, if, with respect to the same character as that corrected by the operator, the same correction as that made by the operator is carried out automatically, then it is easily expected that the burden on the operator can be reduced. However, if the automatic correction is made only by means of comparison of the recognized results obtained from the one correction operation, then the characters that are recognized correctly may also be modified or corrected, to exert ill effects on the performance of the document recognition device.

SUMMARY OF THE INVENTION

The present invention aims at eliminating the drawbacks found in the above-mentioned conventional devices.

It is an object of the invention to provide a document recognition device which, in correcting recognized results, is capable of automatically correcting only mis-recognized characters with accuracy to reduce an operator's burden required for correction.

In order to achieve the above object, the invention provides a document recognition device comprising: character recognizing means for recognizing a character image; a correction data base in which correction information on mis-recognized characters which were targets to be corrected by an operator has been registered; automatic correction means for correcting results recognized by the character recognizing means by use of the correction data base; operator's correction means by which the operator corrects results corrected by the automatic correction means; and correction data base updating means for registering, in the correction data base, correction information obtained from the results recognized by the character recognizing means and the results corrected by the operator's correction means.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of a preferred embodiment of the document recognition device according to the present invention with reference to the accompanying drawings.

Figure 2:
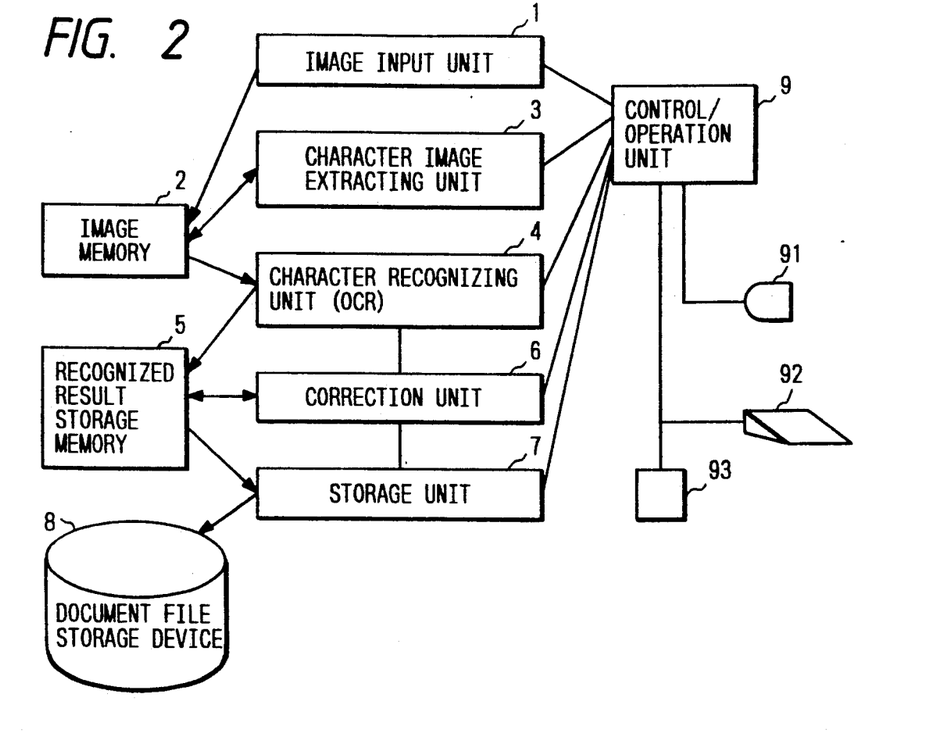
FIG. 2 is a block diagram showing the outline of the whole document recognition device.

In FIG. 2, there is shown an outline of the whole document recognition device according to the embodiment of the invention. The document recognition device includes an image input unit 1, an image memory 2, a character image extracting unit 3, a character recognizing unit (OCR: Optical Character Reader) 4, a recognized result storage memory 5, a correction unit 6, a storage unit 7, a document file storage device 8, and a control/operation unit 9.

In the document recognition device, an image (an original image) on a paper document is digitally input from the image input unit 1 such as an image scanner or the like, and the original image is stored in the image memory 2.

Figure 3A:
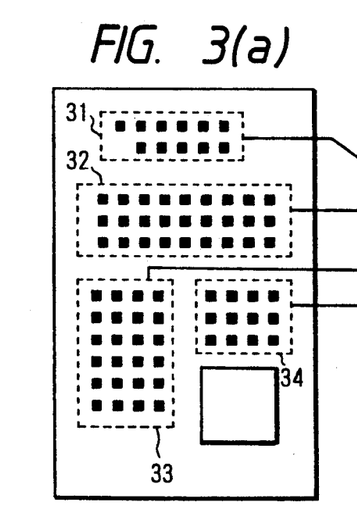
FIGS. 3(a) and (b) are views showing an example of extraction of a character image area.
Figure 3B:
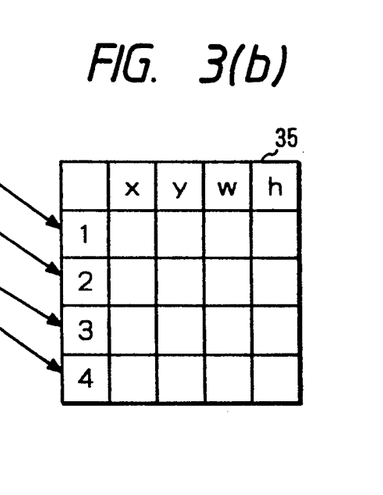

The input document image is displayed on a display device 91 such as a CRT or the like through the character image extracting unit 3 and control/operation unit 9. If an operator specifies only a character image area by use of a specifying device 93 such as a mouse or the like while observing the original image, then the character image extracting unit 3 extracts the area specified. FIG. 3(a) shows a state in which only the character image areas are specified with respect to an actual document. Areas 31, 32, 33 and 34 surrounded by dotted lines in a rectangular form are the portions that have been specified by the operator. Information on the character image areas specified in this manner is then stored in a table 35 as shown in FIG. 3(b). First and second columns are the left upper coordinates (x, y) of the character image rectangular areas, and third and fourth columns are the width w and height h of the character image rectangular areas.

As a method of extracting the character image areas, besides the above-mentioned method to be operated by the operator, a known method of automatically separating the characters and figures from each other by extracting the characteristics of the character image areas may be employed (see, for example, Japanese Patent Unexamined Publication No. Hei. 2-159690).

Figure 4:
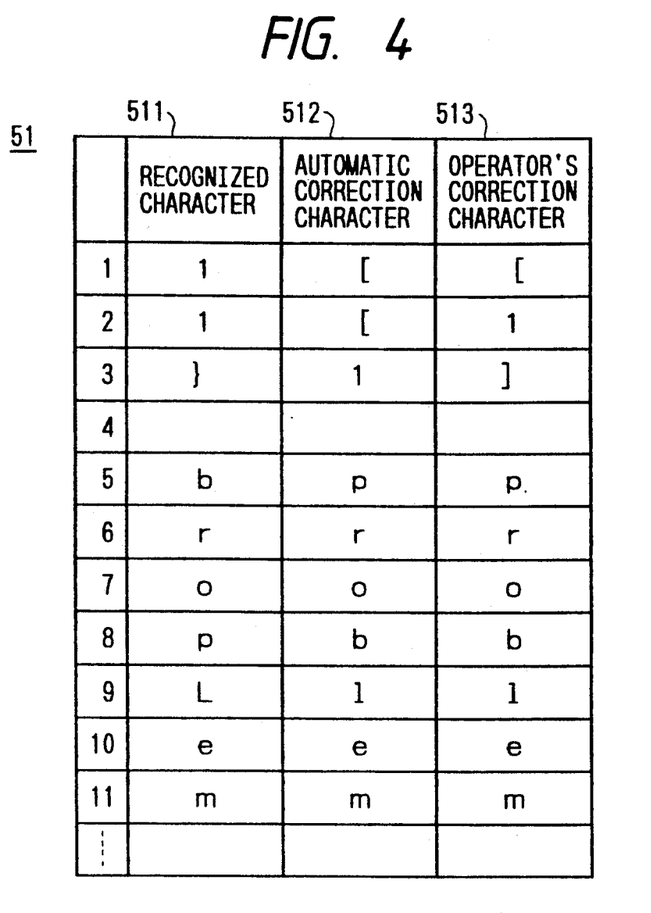
FIG. 4 is a table which stores the recognized results obtained from a character recognizing unit, results obtained after automatic correction, and results obtained after correction by an operator.

The character recognizing unit 4 recognizes characters in the specified character image areas by use of the image memory 2 and table 35 representing the extracted character image area. Then, the recognized results are stored into a recognized character section 511 of a recognized result storage table 51 contained in the recognized result storage memory 5, every character image area and in a table form as shown in FIG. 4. Further, the recognized result storage table 51 exists for each of the character areas in the table 35.

Figure 1:
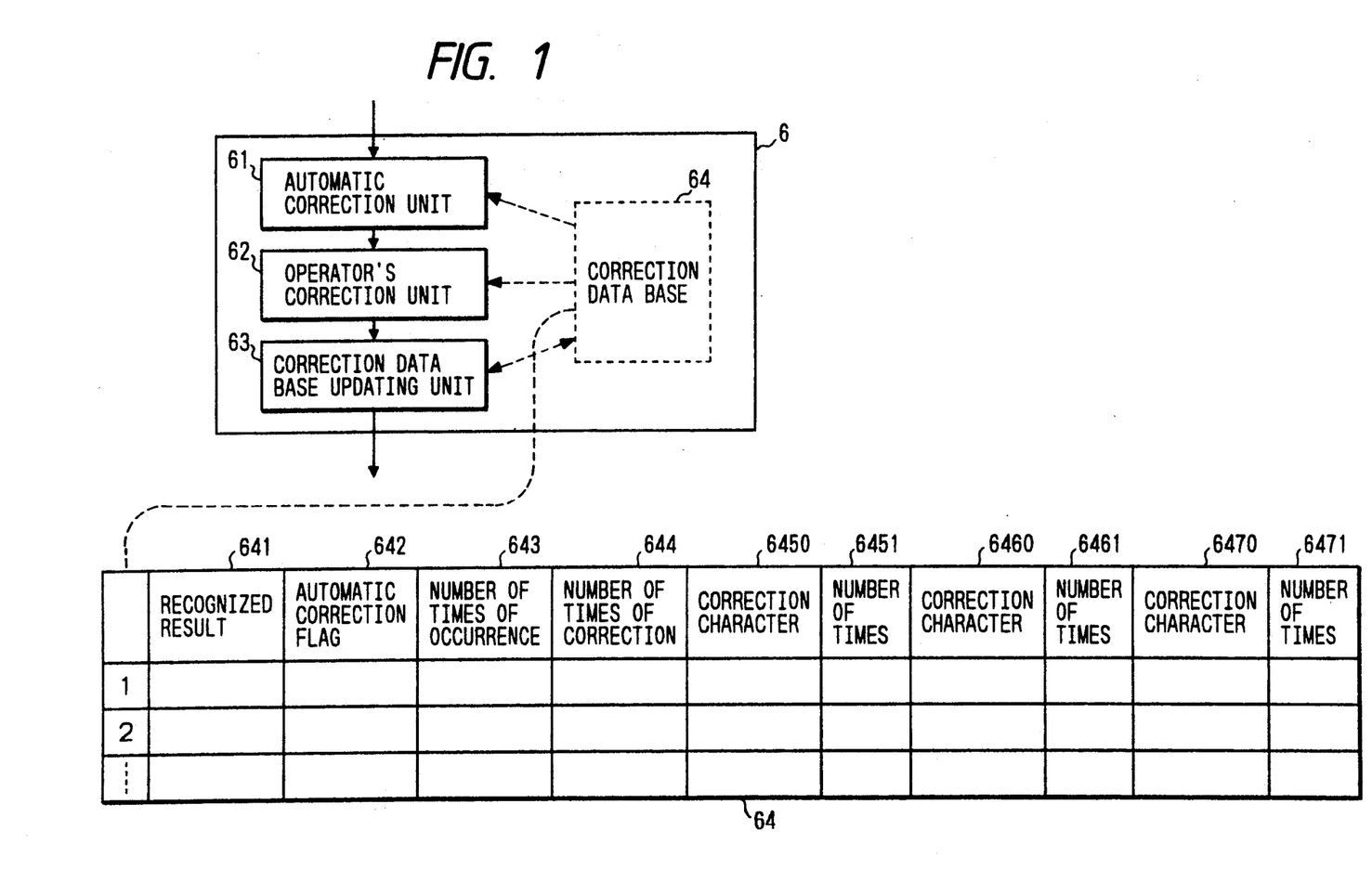
FIG. 1 is a block diagram showing an embodiment of the document recognition device according to the invention.

The correction unit 6, as shown in FIG. 1, includes a correction data base 64 for registering therein correction information as to mis-recognized characters which are targets to be corrected by the operator, an automatic correction unit 61 for correcting results recognized by the character recognizing unit 4 by use of the correction data base, an operator's correction unit 62 for performing a correcting operation by the operator, and a correction data base updating unit 63 for registering in the correction data base 64 the recognized results and the correction information that is obtained from the results of the correction made by the operator's correction unit 62.

A processing to be performed at first in the correction unit 6 is to, in the automatic correction unit 61, automatically correct characters corresponding to the characters to be automatically corrected with respect to the characters of the recognized character section 511 within the recognized result storage memory 5, by utilizing the correction data base 64. This processing will be described below with reference to a flow chart of processing in the automatic correction unit 61, as shown in part (A) of FIG. 6.

Figure 6:
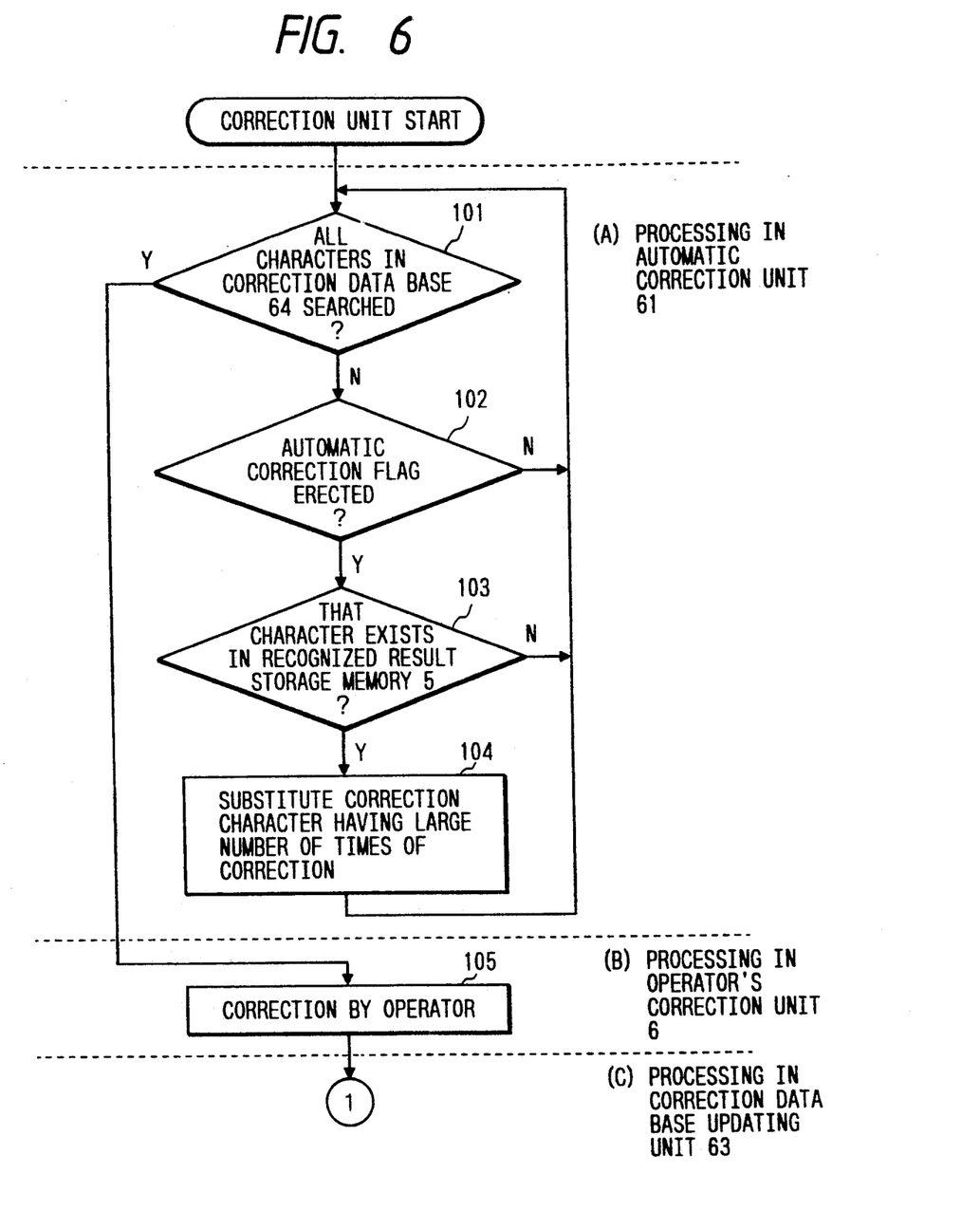
FIGS. 6 to 8 are a flow chart showing an algorithm in a correction unit.

It is checked whether an automatic correction flag 642 is erected (that is, flag = 1) with respect to each of the recognized results in the correction data base 64 or not (Steps 101 and 102).

Then, the character of a recognized result 641 for which the flag is erected is searched from the recognized character section 511 in the recognized result storage memory 5 (Step 103).

If the same character is present, then a correction character (6450, 6460 or 6470) having a larger number of times of correction (6451, 6461 or 6471) is stored in an automatic correction character section 512 within the recognized result storage table 51 (Step 104).

In this manner, Steps 101 to 104 are repeated. In other words, the character of the recognized result 641 for which the next flag is erected is searched from the recognized character section 511, and this processing is repeatedly performed with respect to all of the characters of the recognized result 641 for which the automatic correction flag is erected (the automatic correction flag will be described later).

Thereafter, the characters of the recognized character section 511 are copied in the blank portions (that is, for the characters that have not been corrected automatically) of the automatic correction character section 512.

Figure 5:
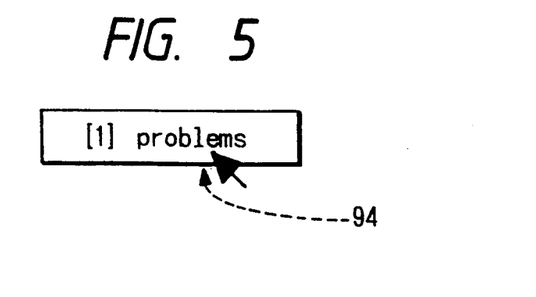
FIG. 5 is a view showing an example of correction to be performed in an operator's correction unit.

In the operator's correction unit 62, the operator corrects a series of the characters of the automatic correction character section 512 that have been automatically corrected (Step 105). This operator's correction is made because either the rate of recognition of the character recognizing unit 4 or the rate of correction of the automatic correction unit 61 does not provide 100% in a pure sense in the current art of character recognition/automatic correction and this fact requires the confirmation/correction by the operator. In this correction operation, the characters in the automatic correction character section 512 within the recognized result storage table 51 of the recognized result storage memory 5 are displayed on the display device 91 through the correction unit 6 and control/operation unit 9. The operator corrects the characters by use of the specifying device 93 such as a mouse, or a key board 92 while observing the recognized results. The display is made in such a manner that the recognized results are displayed at a position where the original character image was present, that is, the recognized results are displayed in the same condition as the original image as much as possible, so that a character mis-recognized is found with ease. In the operator's correction unit 62, if the operator observes such display and finds the mis-recognized character, then the operator uses the specifying device 93 to move a cursor 94 onto the mis-recognized character as shown in FIG. 5, and uses the key board 92 to input a correct character. This input character is substituted for the mis-recognized character to achieve the correction.

The corrected result is registered in an operator's correction character section 513 in the recognized result storage table 51 as shown in FIG. 4. As a result of this operation, all of the results obtained by the character recognizing unit 4, automatic correction unit 61 and operator's correction unit 62 are stored in the recognized result storage table 51.

Figure 7:
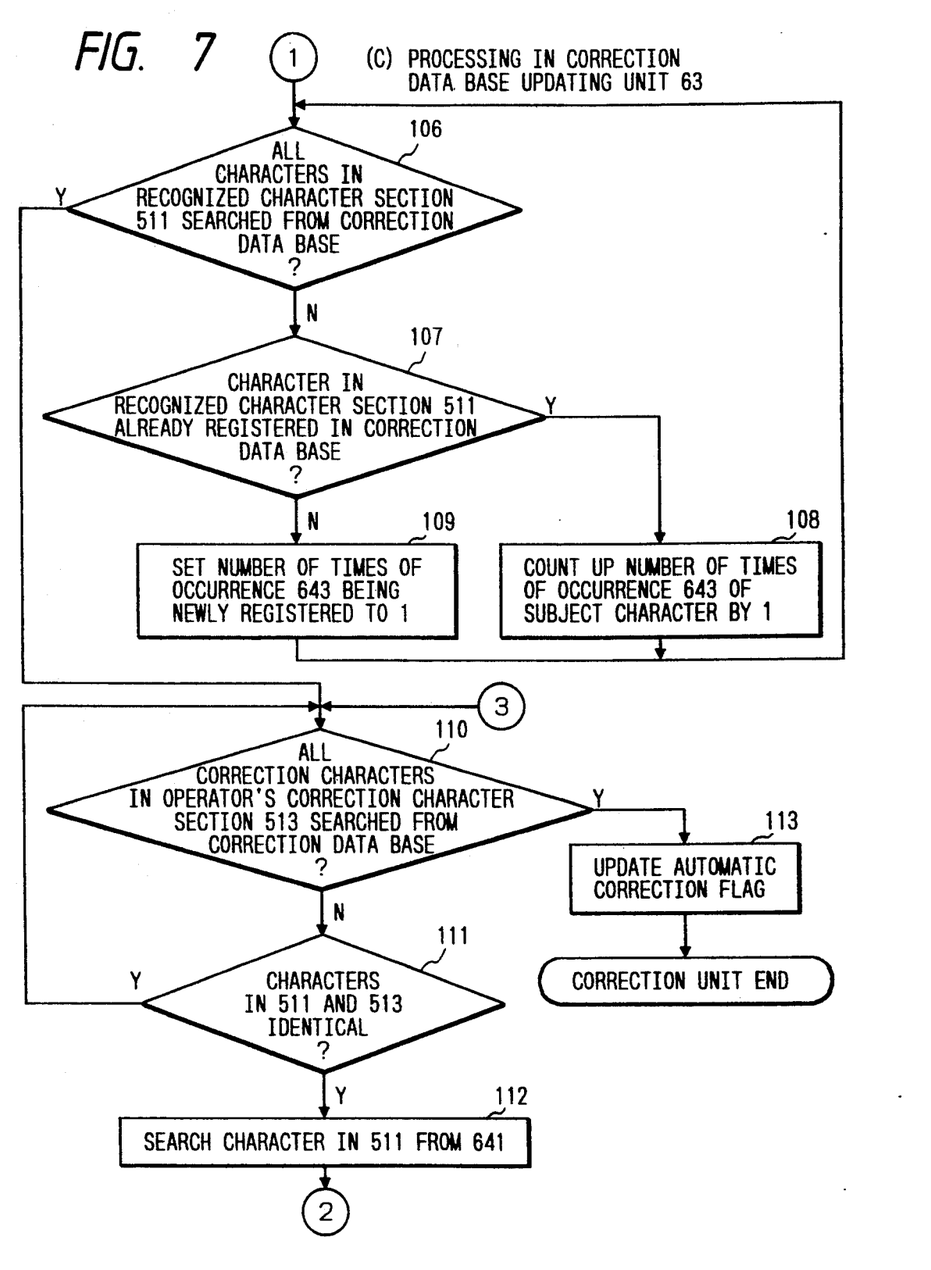
Figure 8:
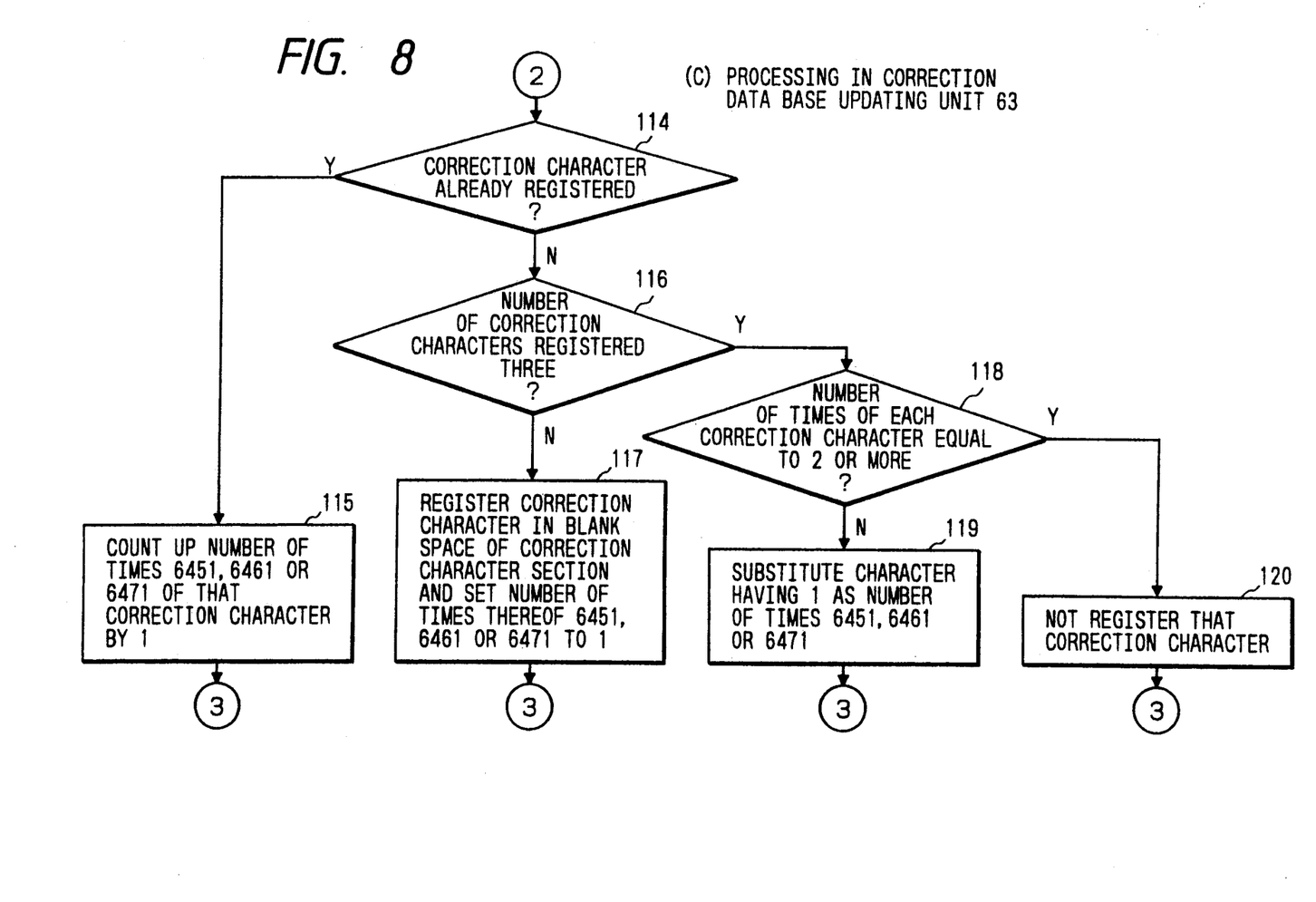

Next, the contents of the processing to be performed by the correction data base updating unit 63 will be described below by way of a flow chart of the processing thereof shown in part (C) of FIGS. 7 and 8.

The recognized character 511 is registered in the correction data base 64. That is, it is checked whether the character of the recognized result 641 in the correction data base 64 is identical with any of the characters of the recognized character section 511 or not (Steps 106 and 107).

If it is found that the same character is present, the number of times of occurrence 643 is counted up by 1 (Step 108).

If there exists a character which is not present in the recognized result section 641 of the correction data base 64, the character is newly registered in the recognized result section 641, and the number of times of occurrence is set as 1 (Step 109).

When all of the characters in the recognized character section 511 have been searched from the correction data base (that is, if the decision result of Step 106 is found Yes), then the correction characters are registered.

At first, the character of the recognized character section 511 in the recognized result storage table 51 is compared with the character of the operator's correction character section 513 (Steps 110 and 111).

As a result of this comparison, if it is found that the characters are different from each other, the character of the recognized character section 511 is searched from the recognized result section 641 of the correction data base 64, and the number of times of correction 644 of the corresponding recognized result is counted up by 1 (Step 112).

Then, it is checked whether the correction character of the operator's correction character section 513 exists in the correction character section (6450, 6460 or 6470) of the correction data base 64 (Step 114).

If it is found that the character exists in the correction character section, the number of times (6451, 6461 or 6471) of the correction character is counted up by 1 (Step 115).

If the character does not exist the correction character section, that is, if the character has not been registered, it is checked whether the number of correction characters registered in the correction data base 64 is equal to 3 or not (Step 116). If it is found that the number of correction characters is less than 3, the above-mentioned character of the operator's correction character section 513 is registered as a correction character in the blank correction character section (6450, 6460 or 6470), and the number of times (6451, 6461 or 6471) of the correction character is set to 1 (Step 117).

Further, if it is found in Step 116 that the number of correction characters registered in the correction character section is equal to 3, it is checked whether the number of times of each correction character is equal to 2 or more (Step 118).

If there exists a correction character of which the number of times (6451, 6461 or 6471) is equal to 1, then the character of the operator's correction character section 513 is substituted for the correction character (6450, 6460 or 6470) (Step 119).

Furthermore, if the number of correction characters is equal to 3 and the number of times of each correction character is equal to 2 or more, the correction character is not registered in the correction data base 64 (Step 120).

Next, the automatic correction flag 642 is updated (Step 113). The automatic correction flag 642 is erected if all of the following conditions are satisfied. Values x, y and z are values obtained by means of experiences. By adjusting the values x, y and z, a ratio of the automatic correction can be increased or decreased.

1. The number of times of occurrence 643 is equal to x or more.
2. A correction frequency (the number of times of correction 644/the number of times of occurrence 643) is equal to y% or more.
3. A correction hit ratio (the number of times 6451, 6461 or 6471/the number of times of correction 644) of a correction character having a larger number of times of correction) is equal to z% or more.

With respect to the correction processing, in the first processing (that is, when nothing has been registered in the correction data base), the automatic correction unit 61 does not perform anything.

Figure 9A:
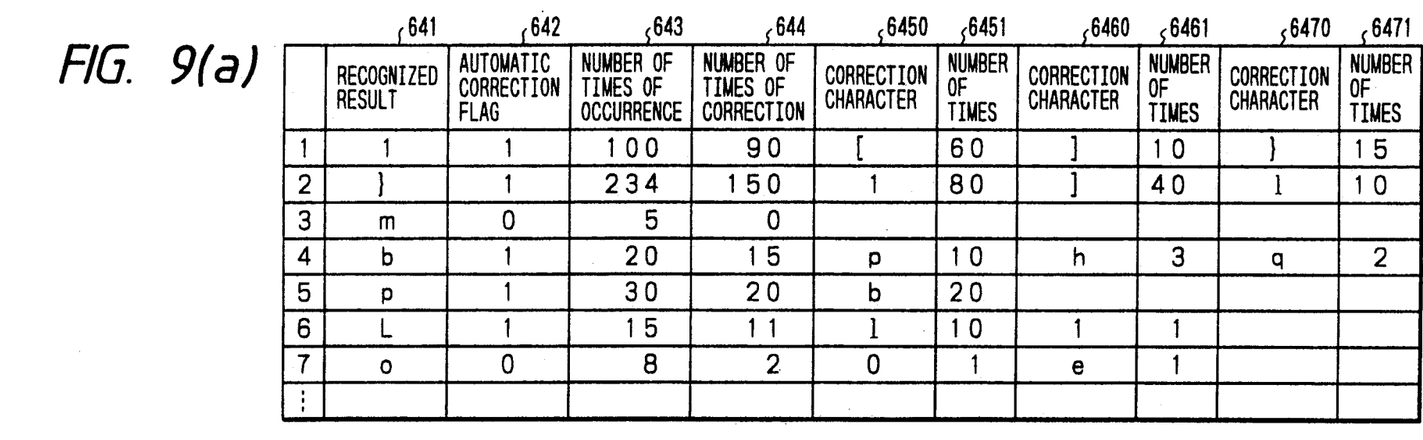
FIGS. 9(a) and 9(b) are tables which represent examples of the contents of the correction data base.
Figure 9B:
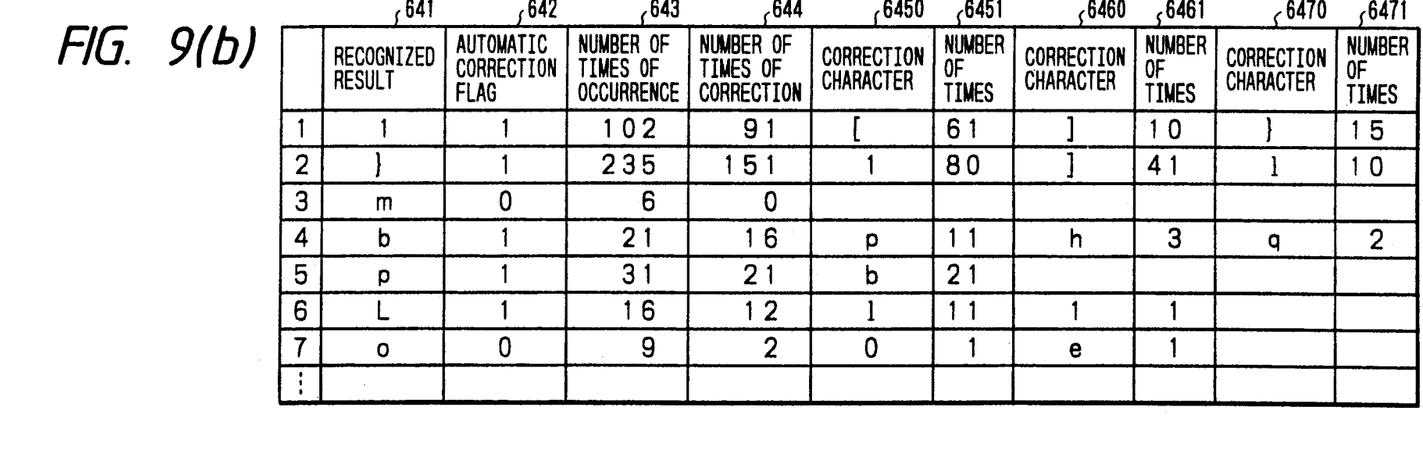

Referring to the correction information that is registered in the correction data base 64, for example, in the case of a correction data base shown in FIG. 9(a), the following correcting operation is performed for the recognized character section 511 shown in FIG. 4. That is, with respect to the characters "1, }, b, p and L" for which automatic correction flags are erected, the automatic correction unit 61 converts "1" to "[", "}" to "1", "b" to "p", "p" to "b", and "L" to "l" (see the automatic correction character section 512 in FIG. 4). Next, correction is made by the operator. In this example, the operator has to correct only the two characters ("[" and "1") that have not been corrected properly by the automatic correction. If the automatic correction is not performed, then the operator has to correct the five characters ("1", "}", "b", "p" and "L"). However, because the automatic correction has been is performed, only two of them are necessary to be corrected. This shows the effect of the automatic correction. Further, after completion of the correction by the operator, the correction data base is updated to a new one as shown in FIG. 9(b).

Thereafter, the storage unit 7 stores the contents of the operator's correction character section 513 in the recognized result storage memory 5 as a document file into the document file storage device 8.

The correction processing of the above-mentioned embodiment is only an example. In other words, the invention is not limited to this correction processing, but it may also be changed as follows:

(1) While in the correction data base updating unit 63 in the above embodiment the automatic correction flag 642 is erected when all of the three conditions are satisfied, alternatively, the automatic correction flag 642 may be erected when one or two of the three conditions are satisfied.

(2) While in the correction data base updating unit 63 in the above embodiment all characters are registered when the recognized character 511 is registered in the correction data base 64, alternatively, only the already registered characters may be counted up and only the mis-recognized characters may be newly registered. This processing method can reduce the capacity of the correction data base 64 to a great extent.

(3) While in the above embodiment the correction character sections (6450, 6460 and 6470) register 3 characters or less fixedly, alternatively, they may be arranged in such a manner that up to the arbitrary number of characters be registered therein.

(4) While in the above embodiment the characters for which the automatic correction flags are erected are all corrected automatically, alternatively, the operator may be required to confirm when they are corrected.

(5) While in the above embodiment the registration in the correction data base 64 is enforced in a unit of one-character, alternatively, the registration may be adapted for two or more characters. For example, characters must be cut out one by one as pre-processing for recognition of the characters.

As has been described heretofore, according to the invention, due to the fact that the same mis-recognized character in the recognized character group is corrected automatically in accordance with the correction performed by the operator in the past, it is possible to reduce a burden on the operator's correcting operation.

Also, according to the invention, because the judgement on the same mis-recognized character is performed by use of the past statistical values, unnecessary correction is not performed for the characters having low correction frequencies, that is, the characters little required for correction, but only the characters having high correction frequencies are corrected, thereby achieving an accurate correcting operation.

What is claimed is:

1. A document recognition device comprising:
   character recognizing means for recognizing a character image;
   a correction data base in which correction information on mis-recognized characters which were targets to be corrected by an operator has been registered;
   automatic correction means for using said correction data base to correct characters mis-recognized by said character recognizing means;
   operator correction means by which the operator corrects characters uncorrected by said automatic correction means; and correction data base updating means for registering, in said correction data base, correction information obtained from the characters recognized by said character recognizing means and the characters corrected by said operator correction means.

2. The character recognition device according to claim 1, wherein the correction information registered in said correction data base includes information on the number of times of occurrence and the number of times of correction for recognized results.

3. The character recognition device according to claim 2, wherein said correction information further includes information on correction characters substituted for the recognized results and the number of times thereof.

4. The character recognition device according to claim 3, wherein said correction data base updating means registers an unregistered correction character in said correction data base when the number of already registered correction characters is less than a predetermined value.

5. The character recognition device according to claim 1, wherein said automatic correction means performs an automatic correcting operation in accordance with an automatic correction flag erected based on the correction information registered in said correction data base.

6. The character recognition device according to claim 1, further comprising memory means for storing therein the results recognized by said character recognizing means.

7. The character recognition device according to claim 6, wherein said memory means further stores therein the results corrected by said automatic correction means and the results corrected by said operator's correction means.

8. The character recognition device according to claim 7, further comprising display means for displaying the results registered in said memory means.

* * * * *